US006178106B1

(12) United States Patent
Umemoto et al.

(10) Patent No.: US 6,178,106 B1
(45) Date of Patent: Jan. 23, 2001

(54) POWER DISTRIBUTION CENTER WITH IMPROVED POWER SUPPLY CONNECTION

(75) Inventors: Hiroshi Umemoto, Beverly Hills; Shenghua Yang, Westland, both of MI (US)

(73) Assignee: Yazaki North America, Inc., Canton, MI (US)

( * ) Notice: Under 35 U.S.C. 154(b), the term of this patent shall be extended for 0 days.

(21) Appl. No.: 09/185,349

(22) Filed: Nov. 3, 1998

(51) Int. Cl.$^7$ .............................. H02M 1/00; H01R 13/62

(52) U.S. Cl. .............................................. 363/146; 439/153

(58) Field of Search ............................... 439/34, 76.2, 78, 439/151, 153, 213; 363/146, 144

(56) References Cited

U.S. PATENT DOCUMENTS

| | | | | |
|---|---|---|---|---|
| 4,192,599 | | 3/1980 | Wittmer | 361/378 |
| 4,630,874 | | 12/1986 | Renn et al. | 339/17 |
| 5,023,752 | * | 6/1991 | Detter et al. | 361/399 |
| 5,088,940 | | 2/1992 | Saito | 439/621 |
| 5,203,712 | | 4/1993 | Kilpatrick et al. | 439/215 |
| 5,628,642 | * | 5/1997 | Bieringer et al. | 439/153 X |

FOREIGN PATENT DOCUMENTS

| | | |
|---|---|---|
| 1 159 378 | 7/1969 | (GB) . |
| 1 209 072 | 10/1970 | (GB) . |
| 1 393 089 | 5/1975 | (GB) . |
| 2 095 049 | 3/1982 | (GB) . |
| 2 203 296 | 10/1988 | (GB) . |
| 2 247 351 | 2/1992 | (GB) . |

* cited by examiner

*Primary Examiner*—Jessica Han
(74) *Attorney, Agent, or Firm*—Young & Basile, P.C.

(57) ABSTRACT

A power distribution center (PDC), such as those used in automotive vehicle electrical systems, has device for pivotally connecting a power supply terminal with the PDC such that pivoting movement of the terminal relative to a PDC housing inserts the terminal through an aperture formed in the housing and into contact with a bus bar retained within the housing. The pivoting connection between the terminal and the PDC allows the terminal to be securely connected with the bus bar without the need for any tools, and provides a degree of alignment to guide the terminal into the aperture. It also provides leverage so that a worker can easily generate sufficient force to insert the terminal into connection with the bus bar in the presence of a force resisting insertion, such as may be generated by a spring clamp or other device for urging the terminal into contact with the bus bar. According to another feature of the invention, a spring element is provided to urge the terminal into contact with the bus bar to ensure effective electrical contact therebetween.

18 Claims, 4 Drawing Sheets

POWER DISTRIBUTION CENTER WITH IMPROVED POWER SUPPLY CONNECTION

FIELD OF THE INVENTION

This invention relates in general to power distribution centers such as those used in automotive vehicle electrical systems, and more specifically to such a power distribution center having improved means for connecting a power supply cable thereto.

BACKGROUND OF THE INVENTION

Power distribution centers (PDCs) are commonly used in automotive vehicles to simplify electrical system wiring by eliminating multi-branch wiring and consolidating fuses, relays, and other electrical components in a single location. A PDC typically comprises a housing having a plurality of integrally formed external receptacles for receiving electrical connectors, fuses, relays and other circuit components. A bus bar is contained within the housing and is supplied with electrical power from the vehicle alternator and/or battery by a power supply cable. The bus bar has a plurality of blade-like extensions which project into some or all of the receptacles in order to make electrical contact with and distribute power to the components inserted therein.

In one known type of PDC, the power supply cable is secured into electrical connection with the bus bar by a nut and bolt. The bolt is inserted through a hole in a flat section of the bus bar and through an eyelet terminal at the end of the cable, then the nut is threaded over the bolt and tightened to urge the eyelet terminal into contact with the bus bar with sufficient normal force to achieve electrical connection therebetween. An example of such a PDC is disclosed in U.S. Pat. No. 5,088,940.

There are significant problems associated with a nut and bolt connection of the type described above. If either the bolt or the nut has stripped or otherwise defective threads, the resulting connection may be poor. The relatively small surface area of contact between the terminal and the bus bar may not dissipate heat effectively, leading to undesirable heating at the contact surfaces. Also, threading the nut onto the bolt requires that a tool be used and that the nut be tightened to the correct degree, thus adding to the time and cost involved in the assembly work.

SUMMARY OF THE INVENTION

It is an objective of this invention to provide a reliable and secure electrical connection between a power supply cable and a power distribution center (PDC).

It is another objective of this invention to provide a PDC that may be connected with a power supply terminal by a quick and a simple assembly process.

In general, these objectives are achieved by a PDC having means for pivotally connecting a terminal with the PDC such that pivoting movement of the terminal relative to the housing inserts the terminal through an aperture formed in the housing and into contact with the bus bar. The pivoting connection between the terminal and the PDC allows the terminal to be securely connected with the bus bar without the need for any tools, and provides a degree of alignment to guide the terminal into the aperture. It also provides leverage so that a worker can easily generate sufficient force to insert the terminal into connection with the bus bar in the presence of a force resisting insertion, such as may be generated by a spring clamp or other means for urging the terminal into contact with the bus bar.

In a first embodiment of the invention, the pivoting connection is provided by a fulcrum disposed on the PDC housing adjacent one end of the aperture. The terminal snaps into engagement with a terminal cover such that a blade portion of the terminal projects downwardly from the cover. The terminal cover has a projection at one end which is inserted beneath the underside of the fulcrum, and the joined terminal and terminal cover is then pivoted downwardly about the fulcrum to insert the blade through the aperture. Latching means may be provided to secure the terminal cover in proximity with the housing to thereby avoid inadvertent removal of the terminal from the inserted position. The lever may also be shaped so as to substantially cover the terminal and the aperture to protect against the entry of contamination into the housing through the aperture.

According to a second embodiment of the invention, a fulcrum is formed integrally with the portion of the bus bar immediately below the aperture. This fulcrum may take the form of a simple hole formed through the bus bar. The terminal is formed with a short projection extending from the upper edge of the blade, and this projection is inserted through the hole in the bus bar such that the engagement between the projection and the hole creates a pivot point. The terminal is rotated about the pivot point to move the end of the terminal opposite from the projection downwardly toward the housing, thus urging the blade of the terminal downwardly through the aperture and into electrical connection with the bus bar. This is a very simple and inexpensively fabricated configuration, achieving the pivoting effect with a minimum number of parts.

According to another feature of the present invention, a spring member is co-located with the connection portion of the bus bar directly below the aperture to urge the terminal blade and connection portion into contact with one another in order to create sufficient normal force between the two elements to ensure good electrical contact.

In a first embodiment, the spring member comprises a flat contact plate having upper and lower edges bent into curved spring portions. The spring member is flattened somewhat and inserted into the housing from below so that the spring portions push against a vertical wall formed on the inside of the housing adjacent the aperture and the contact plate is biased into contact with the bus bar connection portion. Insertion of the terminal blade through the aperture causes the blade to slide between the bus bar connection portion and the spring member, deflecting the spring member slightly and thus generating the desired normal force.

In another embodiment, the normal force is generated by a spring clamp having first and second parallel plates biased toward one another and which fits around the flat contact portion of the bus bar. Insertion of the terminal blade downwardly through the aperture causes the blade to slide between the contact portion of the bus bar and one of the plates of the clamp.

In a third embodiment, a spring clamp is formed integrally with the connection portion of the bus bar by bending an end of the bus bar back on itself to form two parallel contact plates connected along a vertical edge by a spring loop which biases the plates toward one another. Insertion of the terminal blade through the aperture urges the blade between the contact plates. A additional spring clamp may also be provided to supplement the normal force of the clamp formed with the bus bar, the spring clamp fitting over and around the bus bar contact plates.

DESCRIPTION OF THE PREFERRED EMBODIMENT

Figure 1:
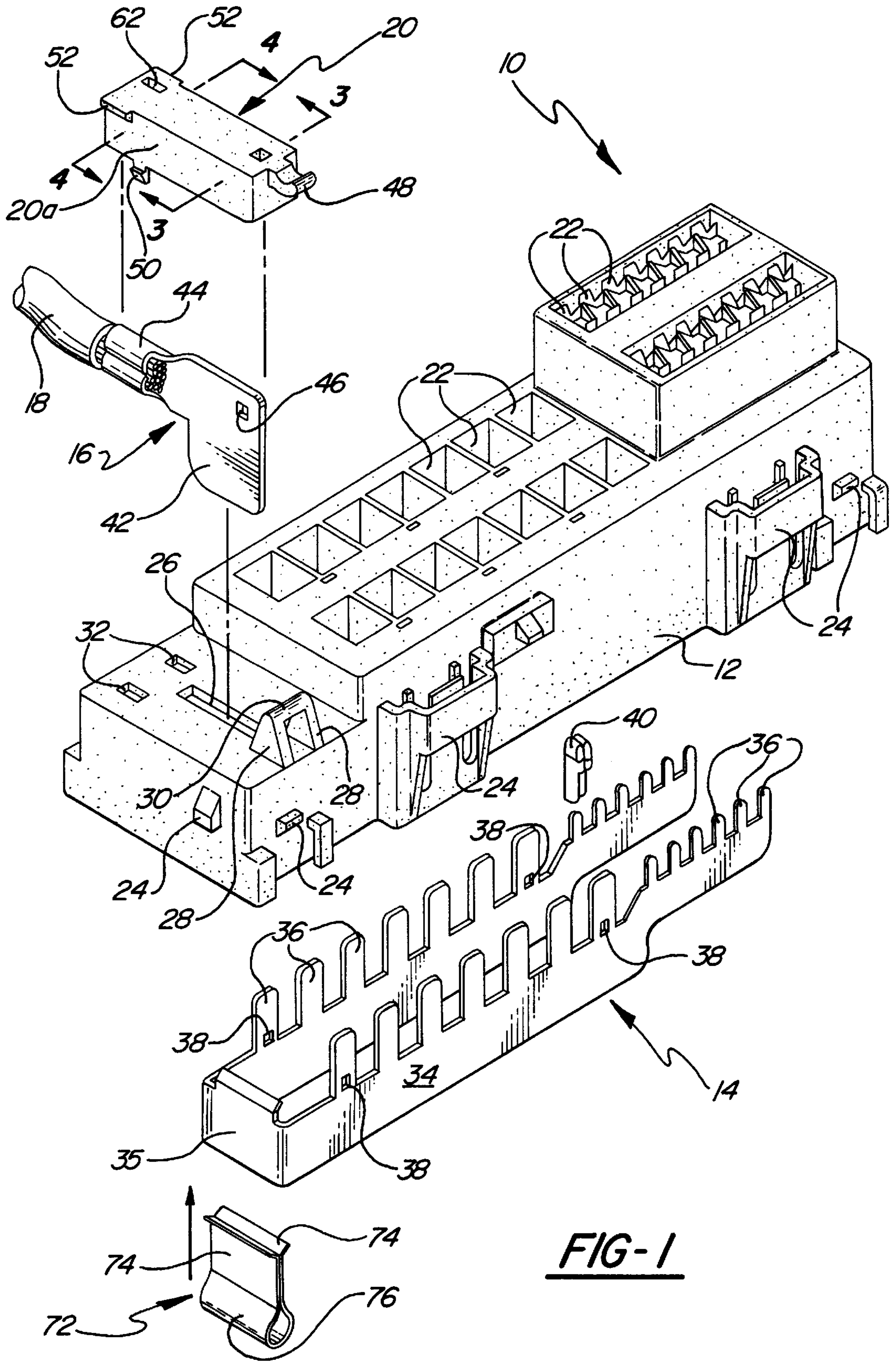
FIG. 1 is an exploded perspective view of a power distribution center (PDC) according to the present invention.

As seen in FIG. 1, a power distribution center (PDC) 10 comprises a substantially hollow housing 12, an electrically conductive bus bar 14 which is inserted into the housing from below, a power supply terminal 16 attached to a cable 18, and a lever 20 for receiving the terminal and pivotally engaging the housing in a manner to be described in greater detail hereinbelow. Although the PDC 10 illustrated is of a type typically used in conjunction with the electrical system of an automotive vehicle, the present invention is not limited to automotive PDC applications, but rather may be beneficially practiced in relation to any PDC in which it is desired to provide a quick, positive, and tool-free connection between the PDC and an electrical cable.

The housing 12 is preferably injection molded from an electrically non-conductive thermoplastic material and has a plurality of receptacles 22 formed on upper surfaces thereof for receiving various electrical circuit components such as fuses and relays (not shown), as is well known in the art. The housing 12 has various latch features 24 molded integrally therewith for securing the housing to a mating lower housing (not shown) for enclosing the bottom of the PDC 10 and/or a cover (not shown) for protecting the upper surface of the housing.

An aperture in the form of a slot 26 is formed through the upper surface of the housing 12, and a pair of parallel support plates 28 extend from the surface of the housing adjacent one end of the slot. A fulcrum bar 30 extends between the upper ends of the support plates 28 such as to be oriented parallel with the upper surface of the housing 12 and perpendicular to the long axis of the slot 26. A pair of latching holes 32 are formed in the surface of the housing 12 adjacent the end of the slot 26 opposite from the fulcrum bar 30.

The bus bar 14 is formed from a thin piece of electrically conductive metal such as tin-plated copper and comprises two elongated bus arms 34 connected by a crosspiece 35. A plurality of finger-like contacts 36 extend upwardly from each of the bus arms 34. The PDC 10 is assembled by inserting the bus bar 14 upwardly into the interior of the housing 12, the bus bar being securely retained therein in a conventionally known manner such as locking tabs (not shown) formed on the interior of the housing and which engage locking holes 38 formed at several locations on the bus bar 14. When the bus bar 14 is installed in the housing 12, the contacts 36 project upwardly into the respective receptacles 22 of the housing 12 in order to make electrical connection with the various circuit components when they are inserted into their receptacles. Prior to installing the bus bar 14 in the housing 12, adapters 40 (only one of which is shown) having female features at both ends may be placed over the bus bar contacts 36 where necessary to properly mate with male terminals of the electrical components.

The terminal 16 is stamped from a flat sheet of electrically conductive metal and comprises an electrical contact portion taking the form of a flat blade 42 and a cable connection portion 44 which is crimped around the core wire of the power supply cable 18. A small hole 46 is formed through the blade 42 adjacent its upper edge.

The lever 20 is formed from an electrically non-conductive material such as thermoplastic and is a generally rectangular, substantially hollow box having parallel side walls 20*a,b*. A hinge finger 48 extends from one end of the lever 20 and has a concave upper surface. Latch tabs 50 extend downwardly from each side wall 20*a,b* adjacent the end opposite the hinge finger 48. Short grip ledges 52 extend outwardly from the upper surface of the lever 20 above the latch tabs 50.

Figure 2:
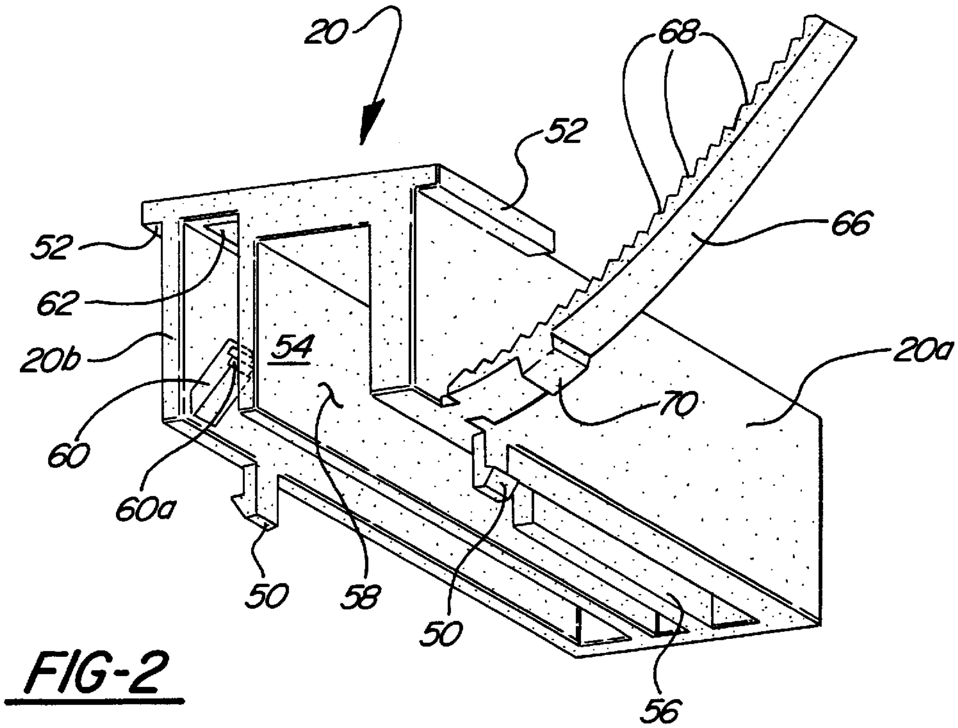
FIG. 2 is a perspective view of a lever according to the present invention.
Figure 3:
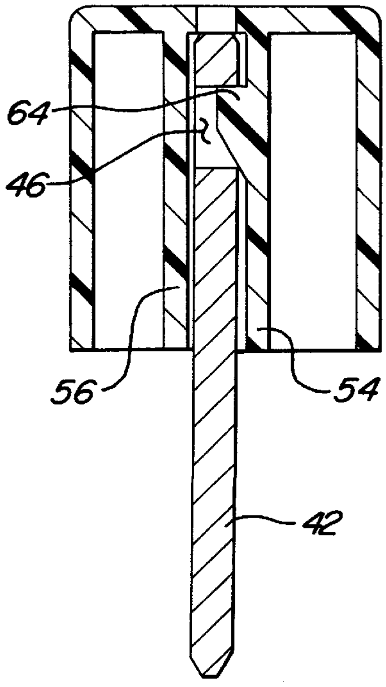
FIG. 3 is a cross-sectional view of the lever with a power supply terminal installed therein according to the present invention; taken along line 3—3 of FIG. 1.

As best seen in FIG. 2, the underside and the second end of the lever 20 are substantially open. A first interior wall 54 runs the full length of the lever 20 and is parallel to the side walls 20*a, b*. A second interior wall 56 runs from the closed end of the lever 20 to a point short of the open end to leave a relatively wide chamber 58 adjacent the open end. A small lock arm 60 projects inwardly from the outer wall of the lever 20 adjacent the open end and has a series of teeth 60*a* projecting from the end thereof. A small slot 62 is formed in the upper surface of the lever 20 immediately above the lock arm 60. A retaining tab 64 projects inwardly from the long interior wall 54 adjacent the first end of the lever 20, as best seen in FIG. 3. A tie strap 66 is attached to the lever 20, preferably by a living hinge, and has a plurality of parallel lock ridges 68 projecting from one surface and a large rectangular bump 70 projecting from the other surface.

A spring clamp 72 (see FIG. 1) is formed from a sheet of spring steel or the like and comprises first and second parallel clamp plates 74 connected along their lower edges by a spring loop 76 that biases the plates into contact with one another. The edges of the clamp plates 74 opposite the spring loop 76 are flared outwardly, away from one another. When assembled, the spring clamp 72 is slid upwardly over the crosspiece 35 of the bus bar 14 to sandwich the crosspiece between the clamp plates 74. The normal force generated by the spring clamp is sufficient to hold the clamp in connection with the crosspiece. When the bus bar 14 is installed within the housing 12, the crosspiece 35 and spring clamp 72 are positioned directly below and parallel with the slot 26.

Figure 4:
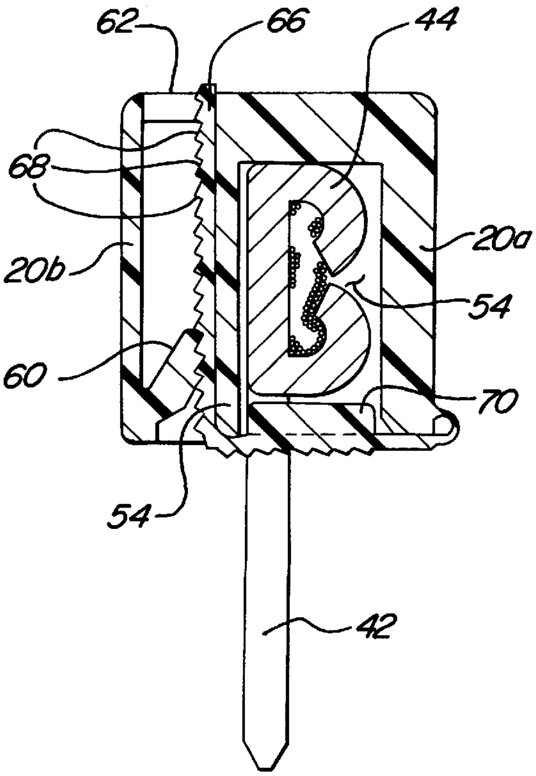
FIG. 4 is a cross-sectional view of the lever and terminal taken along line 4—4 of FIG. 1.

During assembly of an automotive vehicle, the PDC 10 is usually installed in the vehicle (typically in the engine compartment) prior to being connected to the power supply cable 18. To prepare for connection of the power supply cable 18, the terminal 16 is first inserted upwardly into the lever 20 such that the retaining tab 64 on the interior wall 54 of the lever snaps into engagement with the hole 46 in the blade 42 (see FIG. 3) and the connection portion 44 of the terminal is disposed within the chamber 58 adjacent the open end of the lever 20. The tie strap 66 is then wrapped around the underside of the lever 20 such that the bump 70 juts upwardly into the chamber 58 to support the terminal connection portion 44, and the free end of the strap is inserted upwardly between the side wall 20*b* and interior wall 54 of the lever so that the teeth 60*a* of the lock arm 60 engage the ridges 68 on the strap and the tip of the strap projects through the slot 62 in the top of the lever (see FIG. 4). Engagement between the teeth 60*a* of the lock arm 60 and the ridges 68 on the tie strap 66 prevent the strap from loosening.

Figure 5:
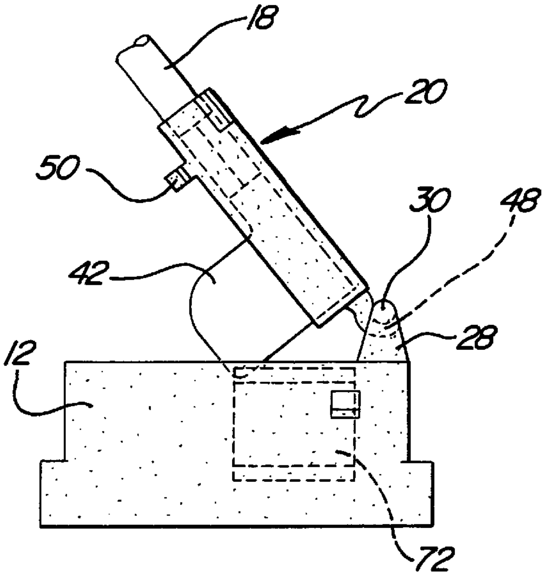
FIG. 5 is a side view of the power distribution center illustrating the lever in a raised, pre-contact position.

To mate the lever/terminal assembly with the housing, the hinge finger 48 extending from the end of the lever 20 is inserted beneath the fulcrum bar 30, with the opposite end of the lever raised so that the terminal blade 42 is clear of the upper surface of the housing 12, as seen in FIG. 5. In this pre-contact position, the terminal blade 42 is directly above and aligned with the slot 26.

The joined lever 20 and terminal 16 are then pivoted downwardly to insert the terminal blade 42 through the slot 26 and between the spring clamp plates 74, which are positioned directly below and parallel with the slot 26 (see FIG. 6). The flared upper edges of the clamp plates 74 guide the blade 42 between the plates such that the blade is in parallel contact with the crosspiece 35 of the bus bar 14. The mating lower housing which encloses the bottom of the PDC prevents the spring clamp from being pushed off the crosspiece by the blade. Alternatively, a lock could be provided within the PDC for holding the spring clamp in position, or a conventional latch mechanism could be placed on the spring clamp and crosspiece. The inward pressure supplied by the spring clamp 72 urges the blade 42 into contact with the crosspiece 35 with sufficient force to ensure good electrical connection therebetween.

Figure 6:
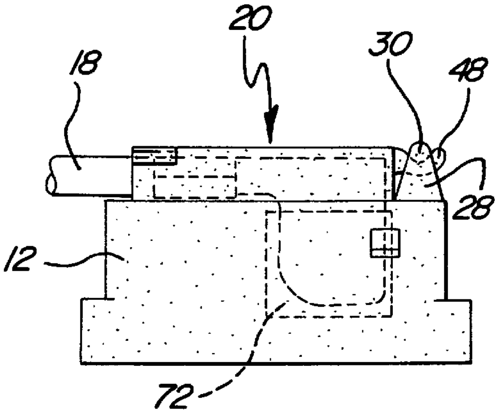
FIG. 6 is a side view illustrating the lever in an inserted, electrical connect position.

When the terminal 16 is fully inserted to the electrical connect position shown in FIG. 6, the latch tabs 50 on the lever 20 engage the latching holes 32 in the upper surface of the housing 12 to secure the lever and terminal in that position.

Figure 7:
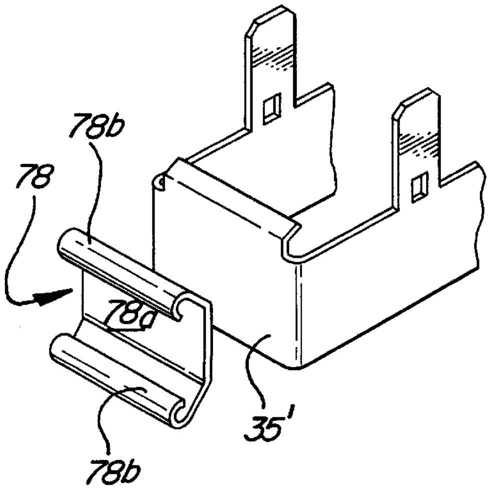
FIG. 7 is a partial perspective view of a modified spring clamp and bus bar.
Figure 8:
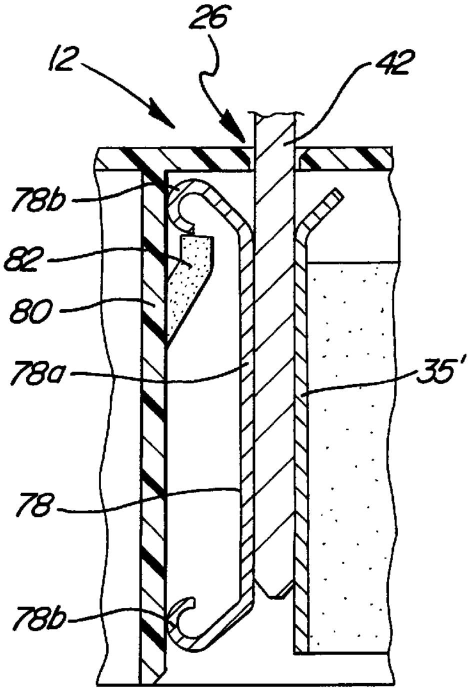
FIG. 8 is a cross-sectional view of the modified spring clamp and bus bar mounted within a power distribution center housing.

FIGS. 7 and 8 depict an alternative means for providing the normal force between the terminal blade 42 and the bus bar 14. In this embodiment, the upper edge of the bus bar crosspiece 35' is bent to one side, and a spring element 78 replaces the spring clamp 72 of the first embodiment. The spring element 78 comprises a flat contact plate 78*a* having upper and lower edges bent into curved spring portions 78*b*. A vertical wall 80 is disposed on the interior of the housing 12, the wall offset a short distance from the slot 26 and extending parallel thereto. A retaining arm 82 extends from the surface of the vertical wall 80 toward the slot 26.

During assembly of this second embodiment of the PDC prior to its installation into the vehicle, the bus bar 14 is inserted into the housing 12 from below, then the spring element 78 is slid upwardly between the vertical wall 80 and the bus bar crosspiece 35'. The spring portions 78*b* must be flattened somewhat in order for the spring element 78 to fit into this space, so that the spring portions push against the vertical wall 80 and the contact plate 78*a* is urged into parallel contact with the bus bar crosspiece 35'. As the spring element 78 is urged upwardly into its position, the uppermost of the spring portions 78*b* rides up over the retaining arm 82 then snaps over the top of the arm to secure the spring element 78 in position.

When the terminal blade 42 is inserted downwardly through the slot 26 in the housing 12 by the pivoting motion described hereinabove, it slides between the bus bar crosspiece 35' and the contact plate 78*a*, further flattening the spring element 78 so that the terminal blade 42 is urged firmly into contact with the crosspiece, as seen in FIG. 8.

Figure 10:
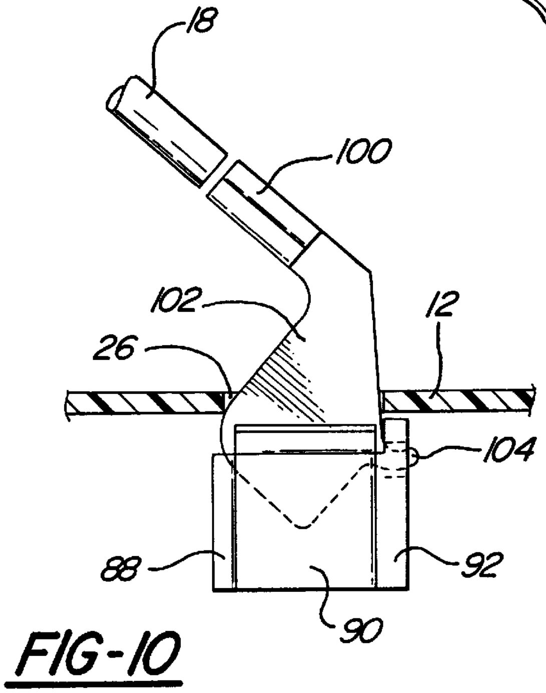
FIG. 10 is a partial cross-sectional view taken along line 10—10 of FIG. 9 illustrating the terminal partially inserted into contact with the bus bar.
Figure 9:
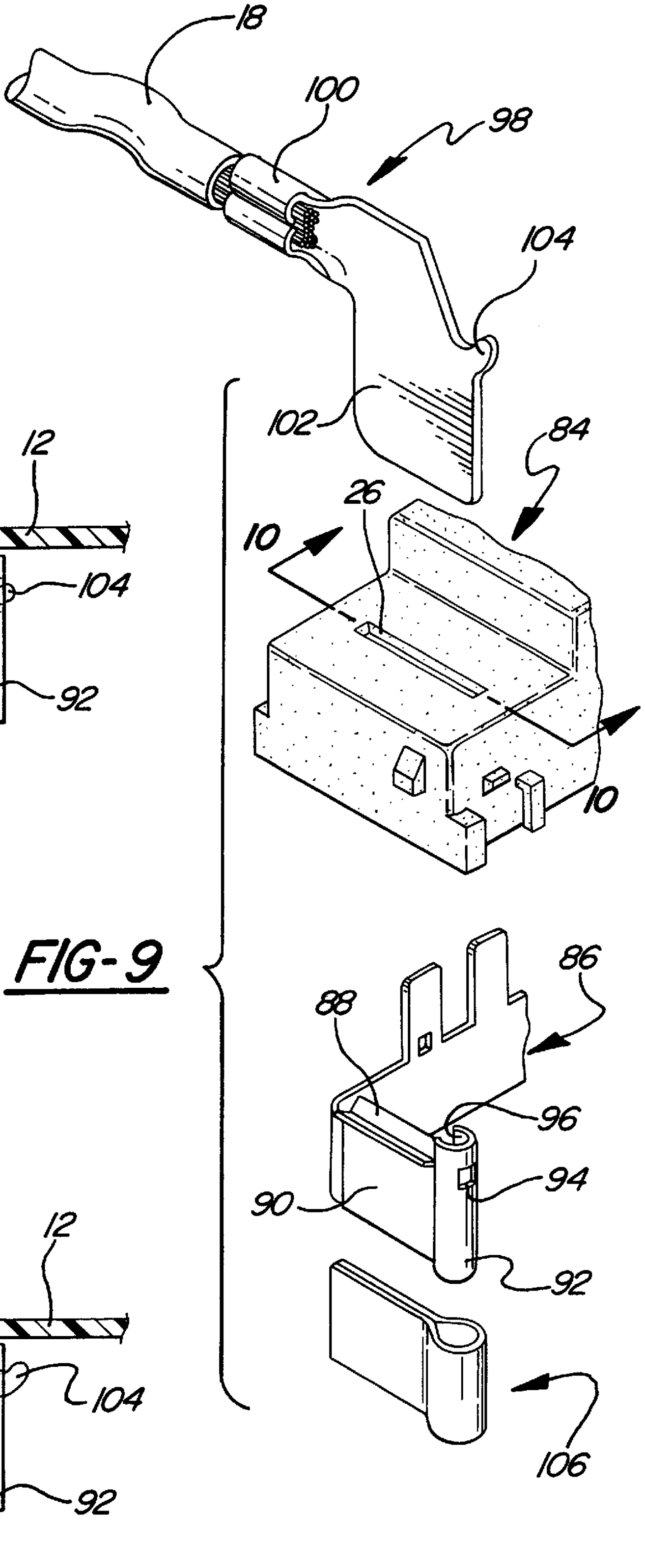
FIG. 9 is an exploded perspective view of a PDC according to a second embodiment of the invention.
Figure 11:
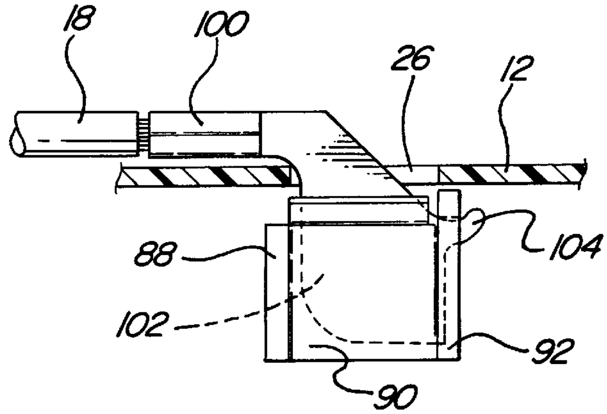
FIG. 11 is a partial cross-sectional view taken along line 10—10 of FIG. 9 showing the terminal fully inserted into contact with the bus bar.

FIGS. 9–11 depict a second embodiment of the invention in which the fulcrum for achieving pivoting engagement with the terminal is integrated with the bus bar, and the terminal itself engages the fulcrum.

The housing 84 of this embodiment is substantially similar to the previously described embodiment, except that it does not feature the fulcrum bar 30, the support plates 28, nor the latching holes 32 on the upper surface of the housing.

The bus bar 86 has a connection portion comprising a first contact plate 88 extending from one end of a bus arm, a second contact plate 90 in parallel contact with the first contact plate, and a spring loop 92 joining the first and second contact plates along their edges and extending upwardly beyond the upper edges of the contact plates. The first and second contact plates 88,90 and the spring loop 92 are all formed integrally with the bus arm by a stamping process.

A fulcrum hole 94 is formed through the spring loop 92 adjacent its upper end on the side opposite the contact plates 88,90, and the upper end of the spring loop 92 opposite the fulcrum hole 94 is notched to form a gap 96 between the edges of the loop above the contact plates. The upper edges of the contact plates 88,90 are flared outwardly.

A terminal 98 for use with this embodiment comprises a cable connection portion 100 for crimping onto a cable 18 and a flat blade 102 having a downward sloping upper edge leading to a curved horn 104 projecting outwardly and upwardly from the end of the blade.

When the bus bar 86 is installed within the housing 84, the outwardly flared upper edges of the contact plates 88, 90 and the upper end of the spring loop 92 are positioned directly below the slot 26. To place the terminal 98 in electrical connection with the bus bar 86, the terminal is tipped downwardly so that the horn 104 may be inserted through the slot 26 and into engagement with the fulcrum hole 94, as seen in FIG. 10. The terminal 98 is then pivoted about the point of engagement between the horn 104 and the fulcrum hole 94 to urge the rest of the blade 102 between the contact plates 88,90 as seen in FIG. 11. A conventional clamp could be provided on the surface of the housing to secure the terminal and prevent the blade from pivoting out of electrical connection with the contact plates. For example, the clamp could receive the cable connection portion 100. An additional spring clamp 106 may also be provided, the spring clamp fitting over and around the contact plates 88,90 and spring loop 92 to increase the amount of normal force urging the contact plates 88,90 into contact with the terminal blade 102.

This embodiment of the invention, when compared with the first embodiment, eliminates the need for a separate lever component and so may be less expensive and quicker to assembly. It should be noted that the fulcrum may be formed integrally with the bus bar while using some other means of providing the normal force urging the terminal into contact with the bus bar, such as the methods shown in FIG. 1 or FIGS. 7 and 8.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A power distribution center for providing electrical connection between a terminal and a plurality of circuit components comprising:

a housing for receiving the circuit components;

a bus bar mounted within the housing and having a connection portion for making electrical contact with the terminal;

an aperture formed in the housing for receiving a contact portion of the terminal therethrough and into proximity with the bus bar connection portion; and means disposed on the bus bar for pivotally engaging a first end of the terminal such that an opposite second end of the terminal is rotatable toward the housing to urge the terminal contact portion through the aperture.

2. A power distribution center according to claim 1 wherein the means for pivotingly engaging the terminal comprises a hole formed in the bus bar for receiving engagement means disposed on the first end of the terminal.

3. A power distribution center according to claim 1 further comprising a spring member disposed within the housing immediately adjacent the aperture for urging the terminal contact portion into contact with the bus bar connection portion.

4. A power distribution center providing electrical connection between an unattached terminal from a power supply and a plurality of circuit components comprising:

a housing for receiving the circuit components;

a bus bar mounted within the housing and having a connection portion for making electrical contact with the terminal;

a slot formed in the housing for receiving a contact portion of the terminal therethrough and into proximity with the bus bar connection portion; and a lever mounted on the housing for pivotal movement relative to the housing, the lever having means for retaining the terminal in engagement with the lever and means for aligning the contact portion of the terminal with the slot, whereby pivotal movement of the lever inserts the terminal contact portion through the slot and into contact with the bus bar connection portion.

5. A power distribution center according to claim 4 wherein the lever has a first end with a hinge finger for engaging a fulcrum bar on the housing and an opposite second end rotatable toward the housing.

6. A power distribution center according to claim 5 wherein the aligning means includes a chamber within the lever for receiving the terminal.

7. A power distribution center according to claim 5 further comprising means for retaining the second end of the lever in proximity with the housing.

8. A power distribution center according to claim 5 wherein the lever comprises means for covering the slot and a portion of the terminal which does not penetrate the slot.

9. A power distribution center according to claim 4 further comprising means within the housing for generating a normal force between a surface of the terminal contact portion and a parallel surface of the bus bar connection portion.

10. A power distribution center according to claim 9 wherein the means for generating the normal force comprises a spring device for urging the surfaces of the terminal and the bus bar connection portion together.

11. A power distribution center according to claim 10 wherein the spring device comprises a clamp which urges the terminal and the bus bar connection portion together.

12. A power distribution center according to claim 10 wherein the bus bar connection portion comprises first and second elements for receiving therebetween the terminal contact portion, and the spring device comprises a member integral with and connecting the elements and exerting a spring force to urge the elements toward one another.

13. A power distribution center according to claim 10 wherein the spring device comprises a flexible element supported by a wall of the housing for urging the terminal contact portion and the bus bar connection portion together.

14. A power distribution center for providing electrical connection between a power supply cable and a plurality of circuit components comprising:

a terminal attached to the cable and having a flat contact portion;

a housing for receiving the circuit components;

an aperture formed in the housing for receiving the terminal therethrough;

a bus bar mounted within the housing and having a connection portion adjacent the aperture for making electrical contact with the terminal;

means adjacent the aperture for movably connecting the terminal to the power distribution center to permit the terminal to pivot relative to the housing to thereby insert the terminal contact portion through the aperture and into contact with the bus bar connection portion; and a spring member disposed within the housing immediately adjacent the aperture for urging the terminal contact portion into contact with the bus bar connection portion.

15. A power distribution center according to claim 14 wherein the terminal contact portion is a flat blade.

16. A power distribution center according to claim 14 wherein the spring member comprises a flexible element supported by a wall of the housing and having a surface biased into planar contact with the bus bar connection portion prior to insertion of the terminal through the aperture, whereby insertion of the terminal through the aperture urges the terminal contact portion between the spring member surface and the bus bar connection portion.

17. A power distribution center according to claim 14 wherein the bus bar connection portion comprises first and second elements for receiving therebetween the terminal contact portion, and the spring member is formed integrally with the elements and exerts a spring force urging the elements toward one another.

18. A power distribution center according to claim 14 wherein the spring member comprises a clamp which urges the terminal contact portion and the bus bar connection portion together.

* * * * *